Patented Jan. 2, 1923.

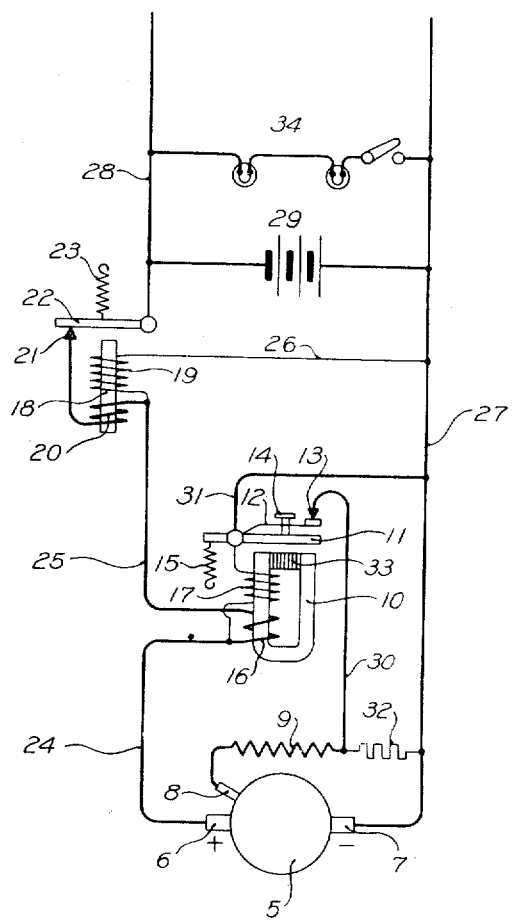

1,440,879

UNITED STATES PATENT OFFICE.

THOMAS L. LEE AND RAYMOND H. SULLIVAN, OF ROCHESTER, NEW YORK, ASSIGNORS TO NORTH EAST ELECTRIC COMPANY, OF ROCHESTER, NEW YORK, A CORPORATION OF NEW YORK.

ELECTRIC SYSTEM FOR VEHICLES.

Application filed January 20, 1921. Serial No. 438,641.

*To all whom it may concern:*

Be it known that we, THOMAS L. LEE and RAYMOND H. SULLIVAN, citizens of the United States, residing at Rochester, in the county of Monroe and State of New York, have invented certain new and useful Improvements in Electric Systems for Vehicles; and do hereby declare the following to be a full, clear, and exact description of the invention, such as will enable others skilled in the art to which it appertains to make and use the same.

This invention relates to electric systems of the kind in which a storage-battery is charged by a direct-current generator. In systems of this kind, when operated under the supervision of a skilled attendant, it is customary to determine the time when the battery is fully charged by reference to electric measuring instruments and observation of the temperature of the battery, or the specific gravity of the electrolyte, and the result depends upon the care and skill of the attendant.

Where the electric system has the form of a small isolated plant, or the apparatus on a motor vehicle or a railway-car, skilled supervision must be dispensed with and the operation of the system must be mainly or wholly automatic. Various arrangements have been proposed for this purpose, in some of which it has been attempted to limit or prevent overcharging of the battery by the use of automatic controlling devices; but for the most part the delicacy and irregularity of such devices have caused their abandonment, and in the vast majority of such small systems nothing is attempted beyond holding the overcharging of the battery down to a degree at which it will not be too quickly destructive to the battery.

An object of the present invention is to provide a system, of the type in question, with simple and reliable means by which the charging of the battery will be discontinued automatically whenever the battery has become fully charged. A further object of the invention is to provide for the automatic resumption of the charging-operation before the battery has become greatly discharged, but to avoid a constant or pulsating operation such as would rapidly wear or burn away the contacts of the apparatus.

It has been proposed heretofore to control the operation of the generator, in a system of the kind in question, by means of a controller connected across the battery terminals and responsive to a predetermined voltage, the controller acting, when such voltage is attained, to diminish or interrupt the output of the generator by throwing resistance into circuit with its field-winding or in any other convenient manner. Among other defects of this arrangement as heretofore proposed it has the disadvantage that manually operable means must be used for disconnecting the controller from the battery when the generator is not running, to prevent waste of current from the battery. Another disadvantage lies in the fact that it is difficult to adjust the controller to operate at the right voltages for both stopping and starting the charging operation while avoiding the rapid pulsations characteristic of the ordinary vibrating voltage regulator. This is due to the fact that the voltage curve of the battery turns suddenly upward at the point of full charge, and suddenly downward on discharge, so that a very slight interchange of current between the battery and the rest of the system may change the voltage from one to the other of the points at which the controller is set to start and stop the charging.

In the system of the present invention these disadvantages are overcome by using the charge-controller in combination with a reverse-current cut-out, so that no current can flow back from the battery to the controller under any circumstances, and by so adjusting the controller that after it has stopped the charging of the battery, it does not permit the resumption of charging until the terminal voltage of the generator has fallen below that required to hold the cut-out closed. Whenever the controller acts to stop the charging, by cutting down the voltage of the generator below that of the battery, the cut-out at once opens; but the controller remains effective until the voltage of the generator has been still further reduced, by either reduction in speed or complete stoppage, so that there is no pulsating action of either the controller or the cut-out.

Where the system is used on a motor-vehicle, for which use it is particularly well adapted, the normal operation of the vehicle is certain to involve, at not infrequent intervals, a momentary reduction in speed of the engine and the generator sufficient to cause the voltage of the generator to fall below that required to hold the controller in operation, so that after each interruption of the charging operation the operation may be resumed, after an interval of uncertain but in no case unduly great length.

Another disadvantage of a charge-controller of the type in question, as heretofore proposed, lies in the fact that the voltage across the battery terminals or the generator while the battery is charging is not, in itself alone an accurate measure of the extent to which the battery has been charged. This is due to the fact that this voltage is due to two variables; namely, first, the electromotive force or "open-circuit voltage" of the battery, and, second, the internal resistance of the battery. The electromotive force of the battery, when charged to a given degree, is substantially constant, regardless of temperature, but the internal resistance varies substantially with the temperature of the battery, and this temperature varies not only with atmospheric changes but also in accordance with the rate at which the battery has been charged.

To secure accurate results it is necessary, therefore, to compensate automatically for changes in the temperature of the battery, and a feature of this invention resides in the novel and simple means provided for this purpose. In this respect advantage is taken of the fact that certain generators tend to increase their output with increase in the resistance or counter E. M. F. of the load circuit. This is particularly true of generators of the three-brush type, in which a shunt field-winding is connected between one or more of the main brushes and one or more auxiliary brushes interposed between the main brushes. With such a generator, operating at any given speed, charging a battery which has been charged to any given degree and has attained a corresponding electromotive force, if the resistance of the charging-circuit be increased, by reduction in the temperature of the battery, the voltage across the generator terminals increases to such a degree that the current output increases instead of diminishing. In such a system, therefore, while the condition of the battery, as to charge, cannot be gauged by voltage alone, it can be gauged by reference to the inverse variation of both voltage and current. That is, it may be stated that the moment of full charge in the battery is the moment when $aE - bI = c$ where E is voltage across the battery terminals or the generator-terminals, I is the current flowing through the battery, and $a$, $b$, and $c$ are constants depending upon the peculiarities of the several parts of the apparatus.

While the foregoing expression may not be rigorously true, it has been found to be at least a practical approximation to the fact, and the principle involved may be utilized practically in a very simple manner, by using, as the charge-controller, a relay having a voltage-winding connected across the generator terminals, of high resistance and many turns, and a current or series winding of few turns and low resistance, this latter winding being connected in series with the generator and the battery and being arranged in opposition to the voltage winding.

The accompanying drawing is a conventional diagram of an electric system embodying the present invention.

The invention is illustrated as embodied in an electric system in which the generator 5 has the form of a simple three-brush direct-current machine, such as is often used in connection with a motor-vehicle and driven, at variable speed, by direct connection with the engine of the vehicle. The generator has main brushes 6 and 7, and a third or auxiliary brush 8, the shunt field-winding 9 being energized by current flowing from the brush 8, through the circuit connections hereinafter described, to the main brush 7.

The charge-controller is in the form of a relay, having a magnet-core 10 and an armature 11. The relay is provided with back-contacts, the contact 12, carried by the armature, being in the form of a spring which cooperates with a fixed contact 13. The relay is so constructed that the contacts are not separated by the first part of the movement of the armature towards the magnet. As a conventional construction for this purpose, the armature is shown as provided with a pin 14 having a head which engages and positively moves the spring 12, but not until the armature has performed a part of its movement. The armature is maintained in the illustrated position, with the contacts closed, by means of a spring 15. By suitable adjustment of the spring and the contacts, the relay may be caused to act so that upon the attainment of a certain degree of flux in the magnet, the spring 15 is overcome and the armature begins to move. As it does so the air-gap in the magnetic circuit is shortened, so that the armature moves with rapidly increasing force. Consequently, when the contacts have been separated the armature is in a position to be retained by the magnet notwithstanding a great reduction in the total flux in the magnetic circuit.

The controller is provided with a current-winding 16, comprising a few turns of low resistance, and a voltage-winding 17, comprising many turns of high resistance, these windings being arranged in opposition, as hereinbefore described.

The cut-out is shown as of a typical form, in which the magnet-core 18 is provided with a high resistance voltage-winding 19, and a current-winding 20 of relatively few turns. The fixed contact 21 is engaged by the armature 22 while the battery is being charged, but a spring 23 tends to move the armature to open-circuit position, being adjusted to do so whenever the generated voltage is less than that necessary to charge the battery.

Assuming that the brush 6 is the positive brush of the generator, the current normally flows from this brush through a wire 24 and the current-winding 16 of the controller, and thence through a wire 25 to the cut-out. From the wire 25 a small part of the current flows through the voltage-winding 19 and thence by wires 26 and 27 to the negative brush 7 of the generator. The greater part of the current flows from the wire 25 through the series-winding 20 of the cut-out and thence, by way of the contact 21 and the armature 22, to a wire 28 connected with the positive pole of the battery. The current flows through the battery and thence by way of the wire 27, back to the generator, the battery thus being charged so long as the cut-out remains closed.

During this charging operation a small amount of current flows constantly from the wire 24 to the voltage-winding 17 of the controller and thence, by way of the armature 11 and the wire 31, to the return-wire 27 and back to the generator. The magnetizing effect of the winding 17 always preponderates over the demagnetizing effect of the winding 16, so that as the voltage across the generator terminals increases the pull upon the armature 11 increases, until finally the controller moves to open-circuit position. Prior to this occurrence the current by which the field-winding 9 is energized passes through the controller contacts by way of the wires 30 and 31, and thus has a return path of low resistance to the brush 7. When the controller contacts are open, however, the current through the field-winding has no return path except through a resistance-device 32 connected between the winding and the wire 27. This device is adjusted to have a resistance such as to cut down the field current and thus to reduce the generated voltage to an amount slightly less than that necessary to hold the cut-out closed. The opening of the controller-contacts is thus immediately followed by the opening of the cut-out, so that charging of the battery ceases and the output of the generator is reduced to the small amount necessary to energize the high-resistance windings 17 and 19 of the controller and the cut-out, the object being to maintain the controller in open-circuit position for at least a substantial length of time after it has been moved to this position.

With the apparatus in the condition last described, the controller remains in open-circuit position until the generator has been either stopped, or so reduced in speed that its output is no longer sufficient to hold the controller open. When this occurs the controller closes, thus re-establishing the low-resistance circuit through the field-winding 9. Upon a subsequent starting of the generator or increase in its speed, the cut-out in turn will close in response to a sufficient increase in the generated voltage, and if, in the meantime, the battery has been partly discharged the charging operation will be resumed. If, however, the battery has not been discharged during the interim the controller will again immediately move to open-circuit position, followed by the cut-out, and the apparatus will remain in this condition until the generator is again slowed down or stopped as an incident to the operation of the vehicle.

Although the interval between the interruption and the resumption of the charging operation is based, not directly upon the requirements of the battery, but rather upon the unrelated accidents of the operation of the vehicle, it is certain as a practical matter that this interval will never be unduly long. In the electric systems commonly used on motor-vehicles the battery has a capacity which is large in proportion to the load normally imposed upon it while the vehicle is running, this load consisting merely of lamps, ignition-apparatus, signal-horn, etc., so that there is no danger of the battery being seriously depleted during the longest continuous run of the vehicle at high speed. The only heavy drain upon the battery is that incidental to starting the engine after it has been stopped, but the apparatus automatically takes care of this condition, owing to the fact that it is always in condition to resume charging of the battery when the engine is started from a condition of rest.

In order that the charge-controller may be sensitive and accurate in this operation, it is desirable to compensate it for changes in the resistance of the voltage-winding 17, due to changes in the temperature thereof. In the diagram a compensating device is shown in the form of a body 33, placed between the poles of the magnet. This body is made of a magnetic material having the characteristic that its permeability diminishes with rise in temperature. This body thus acts as a magnetic shunt; of which the efficacy diminishes as the temperature of the winding 17 increases, thus compensating for the increased resistance of this winding. This method of compensating is shown merely as one convenient device for the purpose, and is not claimed as a part of the present invention.

The relative amount of resistance of the windings 16 and 17 of the controller is a matter which can be best determined by experiment, in any particular application of the invention; but it may be stated, for example, that in connection with a three-brush generator of conventional form, adapted to charge a three-cell lead storage-battery when operated at a speed range of 400 to 2500 R. P. M. at a maximum rate of approximately 20 amperes, 2025 turns of No. 32 copper wire in the voltage-winding 17, and 3 turns of heavy conductor with negligible resistance in the winding 16, have been found to give a satisfactory result. Not only does the current-winding 16 compensate for variations in the internal resistance of the battery, due to changes in temperature or to any other cause, but it also compensates, to a certain degree, for various other disturbing effects in the system. When the temperature of the generator increases, owing to change in atmospheric conditions or to internal heating of the generator, the resistance of the winding 9 increases, so that it tends to take less current, and the generated voltage diminishes. This corresponds to no change in the condition of the battery, but since it results in a reduction in volume of the charging current as well as in the terminal voltage of the generator, the one reduction compensates for the other through the action of the windings 16 and 17 of the controller, so that the controller will still act to discontinue the charging operation at approximately the right moment. Again, if a load, such as the electric lights 34 shown in the diagram, be thrown upon the generator and the battery, this load, by diminishing the resistance of the total load upon the generator, causes a reduction in the voltage effective across the winding 17 of the controller, not necessarily corresponding to any change of condition in the battery. Owing to the peculiarities of the three-brush generator, however, this reduction in voltage causes a corresponding reduction in the current-output flowing through the winding 16, and the two changes approximately neutralize each other.

Although the controller has been described specifically as a magneto-electric device or relay, it is not necessarily limited to this form, but may have any form in which it is capable of acting in respect to the differential effect of voltage and current-flow. It will be understood, also, that the generator is not necessarily limited to the particular form described, and that the invention is not, in general, limited to the details of construction and operation hereinbefore set forth.

The invention claimed is:

1. In an electric system, the combination, with a generator of the three-brush type, a storage-battery charged by the generator, and a reverse-current cut-out connected in series with the generator and the battery, of a charge-controller arranged to control the output of the generator, the charge-controller being connected both across the generator-terminals and in series with the generator and the battery and organized and adjusted to act, under the differential action of the terminal voltage and the current-output of the generator, to interrupt the charging operation when the battery becomes fully charged, by reducing the terminal voltage below that required to hold the cut-out closed.

2. In an electric system, the combination, with a generator of the type in which the output increases with increase in terminal voltage, and a storage-battery charged by the generator, of means for controlling the output of the generator, comprising an electromagnetic device operating, when subjected to a predetermined magnetic flux, to substantially reduce said output; said device having a high-resistance winding of many turns connected across the generator-terminals and a low-resistance winding of few turns connected in series with the generator and the battery and arranged in opposition to said high-resistance winding.

3. In an electric system, the combination, with a generator of the type in which the output increases with increase in terminal voltage, a battery charged by the generator, and a reverse current cut-out connected between the generator and the battery, of a charge-controller arranged to regulate the generator and organized and adjusted to reduce the terminal voltage of the generator to an amount less than that required to hold the cut-out closed, whenever $aE-bI=d$, where E is the terminal voltage of the generator, I is the current output of the generator, and $a$, $b$, and $d$ are constants based upon the characteristics of the several parts of the apparatus.

4. In an electric system, the combination, with a generator of the type in which the output increases with increase in terminal voltage, and a storage-battery connected with and charged by the generator, of a charge-controller arranged to control the operation of the generator and constructed and adjusted to substantially reduce the terminal voltage of the generator whenever $aE-bI=d$, where E is the terminal voltage of the generator, I is the current-output of the generator, and $a$, $b$, and $d$ are constants based upon the characteristics of the several parts of the apparatus.

5. In an electric system, a charge-controller comprising a magnet having a voltage-winding of comparatively high resistance and many turns; a reverse series-winding of low resistance and few turns; an armature controlling back-contacts; means for holding the contacts closed while the armature moves far enough to substantially reduce the air-gap, so that the contacts will be held open under a flux much less than that required to initiate movement of the armature; and means compensating for change of resistance in the voltage-winding due to change in temperature.

THOMAS L. LEE.
RAYMOND H. SULLIVAN.